(12) United States Patent
Bech et al.

(10) Patent No.: US 9,057,356 B2
(45) Date of Patent: Jun. 16, 2015

(54) METHOD FOR DETERMINING A VOLTAGE BOUNDING RANGE

(71) Applicants: John Bech, Hammel (DK); Yin Bo, Brande (DK)

(72) Inventors: John Bech, Hammel (DK); Yin Bo, Brande (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 372 days.

(21) Appl. No.: 13/669,977

(22) Filed: Nov. 6, 2012

(65) Prior Publication Data

US 2013/0161951 A1 Jun. 27, 2013

(30) Foreign Application Priority Data

Dec. 22, 2011 (EP) .................................... 11195355

(51) Int. Cl.
| | |
|---|---|
| G06F 19/00 | (2011.01) |
| F03D 9/00 | (2006.01) |
| F03D 7/02 | (2006.01) |
| H02J 3/16 | (2006.01) |
| H02J 3/38 | (2006.01) |

(52) U.S. Cl.
CPC ............. *F03D 9/005* (2013.01); *Y02E 10/723* (2013.01); *F03D 7/0284* (2013.01); *H02J 3/16* (2013.01); *H02J 3/386* (2013.01); *Y02E 10/763* (2013.01); *Y02E 40/34* (2013.01)

(58) Field of Classification Search
CPC ..... F03D 9/005; F03D 7/0284; Y02E 10/723; Y02E 40/34; H02J 3/16; H02J 3/386
USPC ............................................ 700/287; 290/44
See application file for complete search history.

(56) References Cited

U.S. PATENT DOCUMENTS

| 7,173,349 B2 * | 2/2007 | Bijlenga et al. .................. 307/98 |
| 7,531,911 B2 * | 5/2009 | Rivas et al. ...................... 290/44 |

(Continued)

FOREIGN PATENT DOCUMENTS

| EP | 1914877 A2 | 4/2008 |
| JP | 2004320859 A | 11/2004 |

OTHER PUBLICATIONS

Chen, Wu, et al. "Analysis and comparison of medium voltage high power DC/DC converters for offshore wind energy systems." Power Electronics, IEEE Transactions on 28.4 (2013): 2014-2023.*

(Continued)

*Primary Examiner* — Michael D Masinick

(57) ABSTRACT

A method is provided for determining a voltage bounding range defining a range of a wind turbine reference voltage for a wind turbine for controlling an output voltage of the wind turbine at a wind turbine output terminal. The method includes obtaining information regarding an electrical characteristic of a transmission line connecting the wind turbine output terminal to a point of common coupling to which plural other wind turbines are connectable. The method further includes defining the voltage bounding range based on the electrical characteristic of the transmission line.

17 Claims, 5 Drawing Sheets

(56) References Cited

U.S. PATENT DOCUMENTS

| | | | |
|---|---|---|---|
| 7,583,160 B2 * | 9/2009 | London | 333/33 |
| 8,041,465 B2 * | 10/2011 | Larsen et al. | 700/287 |
| 8,041,466 B2 * | 10/2011 | Helle et al. | 700/287 |
| 8,332,076 B2 * | 12/2012 | Fischle et al. | 700/287 |
| 8,355,829 B2 * | 1/2013 | Arinaga et al. | 700/297 |
| 8,527,104 B2 * | 9/2013 | Arinaga et al. | 700/287 |
| 2006/0255594 A1 | 11/2006 | Larsen | |
| 2011/0058398 A1 * | 3/2011 | Agbossou et al. | 363/74 |
| 2011/0133678 A1 * | 6/2011 | Tomigashi | 318/400.04 |
| 2013/0161951 A1 * | 6/2013 | Bech et al. | 290/44 |

OTHER PUBLICATIONS

Ruiz, Alejandro Garcés. "Design, Operation and Control of Series-Connected Power Converters for Offshore Wind Parks."*

Automatic Generation Control of a Wind Farm with Variable Speed Wind Turbines; Jose Luis Rodriguez-Amenedo et al: "Automatic Generation Control of a Wind Farm with Variable Speed Wind Turbines", IEEE Transactions on Energy Conversion, IEEE Service Center, Piscataway, US, vol. 17, No. 2, Jun. 1, 2002, XP011072090.

* cited by examiner

METHOD FOR DETERMINING A VOLTAGE BOUNDING RANGE

CROSS REFERENCE TO RELATED APPLICATIONS

This application claims priority of European Patent Office application No. 11195355.0 EP filed Dec. 22, 2011. All of the applications are incorporated by reference herein in their entirety.

FIELD OF INVENTION

The illustrated embodiments relate to a method for determining a voltage bounding range defining a range of a wind turbine reference voltage for a wind turbine for controlling an output voltage of the wind turbine, to a method and to an arrangement for determining a wind turbine reference voltage using the method for determining the voltage bounding range.

BACKGROUND OF INVENTION

A wind turbine part may comprise plural wind turbines which may be electrically connected to a common coupling point (PCC) and which wind turbines may be controlled by a park controller or park pilot. The park pilot may send a voltage reference to each of the wind turbines.

Thereby, in a conventional wind turbine park the voltage reference is limited or bound to be in a range of for example [0.92; 1.08] of a nominal voltage which may also be referred to as per unit (pu).

However, it has been observed, that in some situations applying a fix range does not lead to satisfactory performance of the wind turbines, in particular in the case of changing grid characteristics. Further, it has been observed that a wind turbine voltage controller may be saturated in particular conditions leading to unsatisfactory behaviour.

There may be a need for a method for determining a voltage bounding range defining a range of a wind turbine reference voltage for a wind turbine, for a method for determining a wind turbine reference voltage using the method for determining the voltage bounding range, and for an arrangement for determining a wind turbine reference voltage, wherein controlling the wind turbine may be improved in particular in conditions of changing grid characteristics.

SUMMARY OF INVENTION

This need is met by the subject matter of the independent claims. The dependent claims specify particular embodiments.

According to one embodiment, a method is provided for determining a voltage bounding range defining a range of a wind turbine reference voltage for a wind turbine for controlling an output voltage of the wind turbine at a wind turbine output terminal, the method comprising: obtaining information regarding an electrical characteristic of a transmission line connecting the wind turbine output terminal to a point of common coupling to which plural other wind turbines are connectable; and defining the voltage bounding range based on the electrical characteristic of the transmission line.

The wind turbine may comprise a wind turbine tower, a nacelle mounted on top of the wind turbine tower, wherein the nacelle harbours a rotation shaft at which one or more rotor blades are connected. The rotation shaft may be mechanically connected to an electric generator for generating electric energy upon rotation of the rotation shaft. Further, the wind turbine may comprise a wind turbine controller controlling components of the wind turbine, in particular controlling a converter of the wind turbine which may receive a variable frequency power stream from the electrical converter of the wind turbine. The converter may either be connected to the stator (named full converter) or to the rotor (named double fed generator) of the wind turbine generator.

The wind turbine controller may in particular be adapted to receive the wind turbine reference voltage (in particular from a park controller) based on which the wind turbine controller may supply a control signal(s) to the converter, wherein the control signal may define a firing pattern(s) controlling conductance state of controllable switches within the controller. The firing pattern may in particular comprise a pulse width modulation pattern, in which pulses having different or variable widths are comprised which define on-states and off-states of plural controllable switches, such as IGBTs, within the converter of the wind turbine. Thereby, an output voltage of the wind turbine may be affected and adjusted in accordance to the wind turbine reference voltage.

Ideally, the wind turbine output voltage should be equal or at least approximately equal to the wind turbine reference voltage. Further, the wind turbine reference voltage may control or affect the active power output and/or reactive power output of the wind turbine.

Thus, defining or determining the voltage bounding range (in which the reference voltage lies) may have a significant effect on the output (after a network/grid disturbance) of the wind turbine, since the wind turbine reference voltage and thus also the output voltage of the wind turbine (at least approximately) is limited to lie within the voltage bounding range.

In particular, the voltage bounding range may be customized corresponding to or reflecting the configuration, layout, and/or constitution of the wind turbine and/or the transmission line connecting the wind turbine to the point of common coupling. Thus, the voltage bounding range may depend on (electrical) particularities of the transmission line by which the wind turbine is connected to the point of common coupling.

The information may comprise information of (electric) components arranged within the transmission line and collector grid of the wind farm, such as switches, capacitors, inductors, resistors, transformers and the like and may also comprise information regarding a length of the transmission line and a configuration of the transmission line, in particular the kind of cable or kind of material used to manufacture the transmission line.

Obtaining the information may comprise obtaining information about the components making-up the transmission line and obtaining their respective electrical properties, such as resistance, capacity, inductance. Further, the information obtained may comprise information regarding conductivities and/or connectivity of the components comprised in the transmission line. Alternatively or additionally obtaining the information may comprise obtaining measurement data, in particular electrical measurement data resulting from performing electrical measurements on the transmission line or on one or more components or locations comprised in the transmission line. In particular, voltage and/or current measurements may be comprised in the information.

The voltage bounding range may be dependent on the electrical characteristic of the transmission line. Further, the voltage bounding range may depend on other factors. In particular, the voltage bounding range may be different for two different transmission lines having different electrical characteristics. Thus, the particularity, in particular regarding electrical properties, of the transmission line is taken into account for defining the voltage bounding range.

Thereby, it may be ensured that the wind turbine voltage controller may not be saturated during operation. This may be particularly important for a system with a very low short circuit ratio, also denoted as weak grid. In particular, in a weak grid, if there is an increase in active power production (of the wind turbine), the voltage (of the grid) may drop due to increase in the active power production. Voltage controller may react fast enough to bring voltage back and avoid low voltage fault event and voltage collapse.

If, in a conventional system, the wind turbine voltage controller would have an unrealistic wind turbine reference voltage, in particular if the wind turbine controller is saturated, reactive power support may be delayed which may result finally in a voltage collapse which is highly undesired.

Thus, according to the illustrated embodiments the voltage bounding range is defined taking into account the electrical characteristic of the transmission line, in order to avoid the risk that the wind turbine voltage controller is saturated, as has been observed in a conventional system.

Further, embodiments may assist to comply with grid codes or grid requirements for grid connection of wind turbines/wind turbine farms. In particular, it may be important that after a network disturbance a wind farm voltage control system should restore the voltage to its pre-fault, nominal value in a fast manner. Thereby, the time for restoring the pre-fault voltage may be highly dependent on the voltage bounding range in the voltage control system. Also the restoring may be improved according to embodiments illustrated herein.

Also, in a conventional system a mismatch between the voltage reference limit (or voltage bounding range) and in fact possible operational voltage ranges may cause problems especially during grid voltage disturbance. For example, in a conventional system, when there is a voltage dip in the grid, the voltage controller in the park pilot may be saturated and may dispatch a voltage reference of 1.08 per unit (pu) to all of the wind turbine voltage controllers. As the turbine is not possible to be operated within a voltage between 1.02 and 1.08 pu, the voltage controller may be in the saturation mode. Thus, in a conventional system, after the grid voltage disturbance cleared or is over, it may take a long time for the turbine to exit from saturation. Thus, in a conventional system, in some cases dynamic response requirement from grid code may not be fulfilled. Embodiments o the present technique also improve these kinds of operational conditions.

According to one embodiment, the voltage bounding range is defined to be a voltage range between a maximum voltage and a minimum voltage.

The allowed wind turbine reference voltage may span the range between the minimum voltage and the maximum voltage. Thereby, a simple manner of defining the voltage bounding range is provided, thus simplifying the method. In particular, the maximum voltage and/or the minimum voltage may be based on the electrical characteristic of the transmission line, may in particular depend on the electrical characteristic of the transmission line.

According to one embodiment, the electrical characteristic comprises an impedance and/or a capacity and/or an inductance and/or a length and/or a voltage transformation ratio of the transmission line.

The impedance of the transmission line may be characterized by a magnitude of the impedance and a phase of the impedance. Thus, the impedance may be characterized by a complex value. The impedance and/or the capacity and/or the inductance and/or the length and/or the voltage transformation ratio of the transmission line may contribute to the electrical characteristic of the transmission line and may influence the choice of the voltage bounding range. Thereby, customization of the voltage bounding range fitting to the particular transmission line may be achieved, thereby improving the voltage control of the wind turbine.

According to one embodiment, the electrical characteristic comprises a transformation ratio of a wind turbine transformer connected between the wind turbine output terminal and the point of common coupling, the transformation ratio being a ratio between a voltage at a medium voltage side and a voltage at a low voltage side of the wind turbine transformer.

The wind turbine transformer may transform the wind turbine output voltage to a medium voltage to be transmitted to in particular a park transformer which transmits the power stream to the point of common coupling. The wind turbine transformer may be comprise a tap changer which may allow to change the transformation ratio of the wind turbine transformer. The wind turbine transformer may comprise a primary coil and a secondary coil, in particular for each phase of the electrical output stream or output power or output voltage. The transformation ratio of the wind turbine transformer may contribute to the electrical characteristic of the transmission line. The transformation ratio is the ratio between the primary and secondary coil voltages and this ratio may be adjusted between 1.1 and 0.9, in particular between 1.05 and 0.95—by usage of tap changers.

According to one embodiment, the transformation ratio of the wind turbine transformer is adjusted once and then maintained unchanged, in particular also during operation of the wind turbine for producing electrical power. Thereby, the determining the voltage bounding range may be improved.

According to one embodiment, the maximum voltage is the larger the smaller the transformation ratio is and/or wherein the minimum voltage is the smaller the larger the transformation ratio is. Thereby, it may be avoided that the wind turbine controller gets saturated (due to too high voltage or too high converter current).

According to one embodiment, the maximum voltage and/or the minimum voltage depends on the active power and/or reactive power delivered to the grid, wherein in particular the maximum voltage and/or the minimum voltage depends on a grid impedance.

The grid impedance may be determined based on an inductance, resistance and capacitance of the grid.

According to one embodiment, a difference between the maximum voltage and the minimum voltage is the larger the larger the grid impedance is. In particular for a weak grid (having high grid impedance) the difference (between the maximum voltage and the minimum voltage) may be larger than for a strong grid (having a lower grid impedance than a weak grid).

According to one embodiment, the defining the voltage bounding range comprises establishing a physical/mathematical model of electrical components connected between the wind turbine and the point of common coupling; and/or performing a simulation, in particular a software simulation, of electrical components connected between the wind turbine and the point of common coupling.

The physical/mathematical model may comprise electrical properties of all components comprised in the transmission line and their connectivities. The simulations may be performed on a computer or a general processor, in particular for simulating the voltages and currents, reactive power, active power at different locations of the transmission line, in particular at the output terminal of the wind turbine and at the point of common coupling. Further in particular, the simulations and/or model building may be supplemented by measurement data of the actual implementation or the actual power plant.

Thereby, the electrical characteristics of the transmission line or the complete power plant may accurately be determined. In turn, the determination of the voltage bounding range may be made more accurately.

According to one embodiment, the electrical characteristic comprises a transformation ratio of a wind park transformer connected between the wind turbine transformer and the point of common coupling.

The wind park transformer may comprise a primary coil and a secondary coil, in particular for each phase of the power string. In particular, the wind park transformer may be a tap transformer having a changeable transformation ratio. The wind park transformer may be connected between the wind turbine transformer and the point of common coupling. The wind park transformer may be suitable for transforming the medium voltage provided at the medium voltage side of the wind turbine transformer to a high voltage which is suitable for transmission across long distances.

In particular, the transformation ratio of the wind park transformer may also be changed during operation of the wind turbine such as to keep the medium voltage at the medium voltage side of the wind part transformer at least approximately constant. The transformation ratio of the wind park transformer may also influence the electrical characteristic of the transmission line. Thus, the determination of the voltage bounding range may be further improved by also taking into account the transformation ratio of the wind park transformer.

The wind farm transformer comprising an on load tap changer may be suitable, to ensure that the voltage at the medium voltage side of the wind farm transformer stays at or at least approximately around a nominal or another chosen voltage. Thereby, different tap changer positions may result in different grid plant/grid impedances seen from the wind turbine which in turn may result in different wind turbine operating profiles, e.g. different terminal voltage and different corrective power. On the other hand, different turbine reactive power production may result in different voltage at the turbine output terminal. This in turn may affect the voltage profile on the entire grid and again may induce changes in the tab changer position of the park transformer. In this situation, it may be very important that the turbine voltage control is not saturated and that it can support voltage by reactive power injection. Otherwise, in a conventional system, there would be interference between the main transformer on-load tap changer controller and the turbine voltage controller. This interference may be reduced according to the illustrated embodiments.

According to one embodiment, the method further comprises restricting the voltage bounding range to be between an absolute maximum voltage, in particular 1.08 per unit, and an absolute minimum voltage, in particular 0.92 per unit.

Restricting the voltage bounding range between the absolute maximum voltage and the absolute minimum voltage may be necessary in order to avoid damage of components of the wind turbine. In particular, the wind turbine may be defined to be operated at voltages between the absolute maximum voltage and the absolute minimum voltage. Thereby, damages of components of the wind turbine may be avoided or reduced.

According to one embodiment, the method further comprises measuring the characteristic of the transmission line, in particular regarding possible voltages at the transmission line. In particular, the voltage and/or active power and/or reactive power and/or current may be measured at the point of common coupling. In particular, the voltage and/or active power and/or reactive power and/or current may be measured at the wind turbine output terminal. Further, such electrical quantities may be measured at plural different locations along the transmission line between the wind turbine and the point of common coupling. Thereby, the determination of the voltage bounding range may further be improved.

According to one embodiment, it is provided a method for determining a wind turbine reference voltage for a wind turbine for controlling an output voltage of the wind turbine at a wind turbine output terminal, the method comprising: performing a method for determining a voltage bounding range defining a range of the wind turbine reference voltage for the wind turbine according to an embodiment described above; obtaining an operator reference voltage (in particular from an operator of the wind park); obtaining a measured voltage indicative of a voltage at the point of common coupling to which the wind turbine output terminal is connected via the transmission line; and determining the wind turbine reference voltage based on the operator reference voltage and the measured voltage such as to be within the determined voltage bounding range.

The method may in particular be performed by a wind park pilot or wind park controller controlling a plurality of wind turbines connected to the point of common coupling. Further, the method may comprise obtaining a reactive power measured at the point of common coupling and comparing the (in particular scaled) reactive power at the point of common coupling with the operator reference voltage. The method may further comprise comparing the comparison between the reactive power at the point of common coupling and the operator reference voltage to the measured voltage at the point of common coupling and supplying the result (in particular a difference) to a controller, in particular a PI-controller which finally outputs the wind turbine reference voltage which is then confined or restricted to be within the voltage bounding range previously determined and to be within the absolute voltage limits.

Thereby, it may be avoided or reduced that the method is operated in a saturation regime.

According to one embodiment, the determined voltage bounding range is maintained constant during operation. In particular, it is held constant during energy production of the wind turbine.

Thereby, the method of controlling the wind turbine may be simplified.

It should be understood that features individually or in any combination disclosed, described, mentioned or employed for a method for determining a voltage bounding range or for a method for determining a wind turbine reference voltage may also be applied (individually or in any combination) to an arrangement for determining a wind turbine reference voltage according to one embodiment and vice versa.

According to one embodiment, it is provided an arrangement for determining a wind turbine reference voltage for a wind turbine for controlling an output voltage of the wind turbine at a wind turbine output terminal, the arrangement comprising: an input system adapted to obtain an operator reference voltage and to obtain a measured voltage indicative of a voltage at a point of common coupling to which the wind turbine output terminal is connected via a transmission line; a processor adapted to determine the wind turbine reference voltage based on the operator reference voltage and the measured voltage such as to be within a voltage bounding range, wherein the voltage bounding range is defined based on an electrical characteristic of the transmission line.

The arrangement may in particular be comprised in a wind park controller or pilot.

It has to be noted that the illustrated embodiments have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects are apparent from the examples of embodiment to be described hereinafter and are explained with reference to the examples of embodiment. The illustrated embodiments will be described in more detail hereinafter with reference to examples of embodiment but to which the invention is not limited.

BRIEF DESCRIPTION OF THE DRAWINGS

Embodiments are now described with reference to the accompanying drawings. The invention is not restricted to the illustrated or described embodiments.

DETAILED DESCRIPTION OF INVENTION

Figure 1:
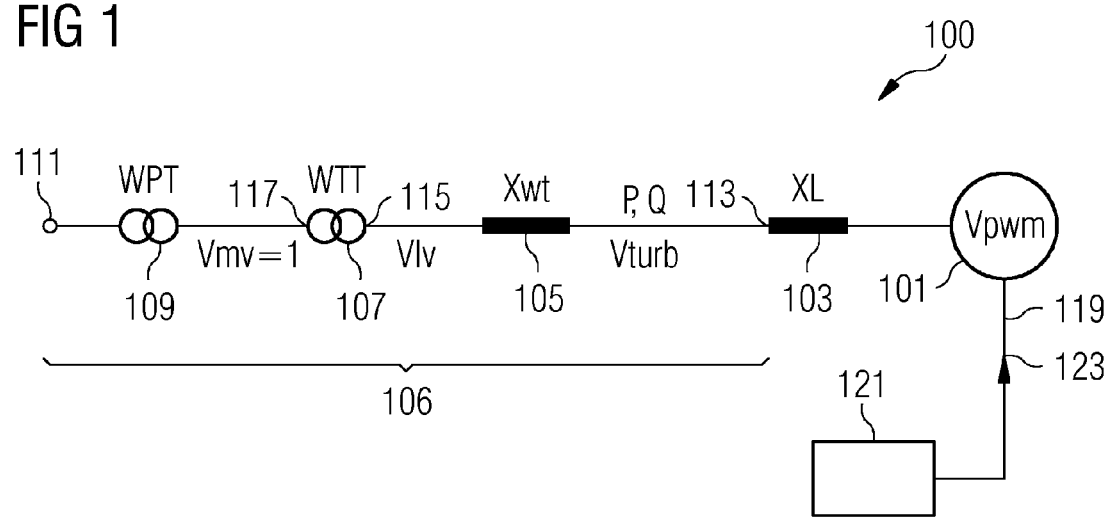
FIG. 1 schematically illustrate a transmission line connecting a wind turbine and a point of common coupling which electrical characteristics is taken into account according to the illustrated embodiments.

FIG. 1 schematically illustrates a portion 100 of a wind farm, wherein a wind turbine 101 is connected via an inductor or reactor 103 (XL), an inductor 105 (XWT), a wind turbine ideal transformer 107 (the inductor 105 represents the short circuit/leakage inductance of the transformer 107) (WTT) and a wind park transformer 109 (WTT) to a point of common coupling 111 to which not illustrated other wind turbines may be connected.

At an output terminal 113 the wind turbine 101 generates (filtered by reactor 103 filtering out high frequency components) the output voltage Vturb comprising active power P and reactive power Q. At the low voltage side 115 of the wind turbine transformer 107 a voltage Vlv is present and on a medium voltage side 117 of the wind turbine transformer 107 a voltage Vmv is present, wherein Vmv is typically constant but may occasionally change depending on grid condition.

The wind turbine transformer 107 is a tap transformer providing a variable transformation ratio m=Vmv/Vlv. In particular, XWT (the inductor 105) refers to the aggregated impedance of the wind turbine transformer 107 and P and Q refer to aggregated active power and reactive power, respectively, from the wind turbine 101.

In FIG. 1 it is assumed that a continuous tap changer is used for the park transformer 109 and that the voltage at the medium voltage side of the wind turbine transformer 107 is between 0.99 pu and 1.01 pu. The wind turbine transformer 107 has several tap positions, such as five tap positions, which correspond to different transformation ratios m. Thereby, the voltage at the low voltage side (115) of the wind turbine transformer 107 is $V_{lv}=V_{mv}/m$, wherein m=1.5, 1.025, 1, 0.5975, 0.95 for the tab changer position at 2, 1, 0, −1, 2, respectively. Thereby, Q is assumed to be known from the turbine capability charge, the output voltage Vturb of wind turbine 101 at terminal 113 may be determined as $$V_{turb} = \sqrt{\frac{2QX_{wt}+V_{lv}^2}{2} \pm \sqrt{(2Q_{wt}+V_{lv}^2)^2 - 4S^2X_{wt}^2}}$$

wherein $S=\sqrt{P^2+Q^2}$

The wind turbine 101 is controlled via a control line 119 by a park pilot 121 which provides via the control line 119 a wind turbine reference voltage 123.

Figure 2:
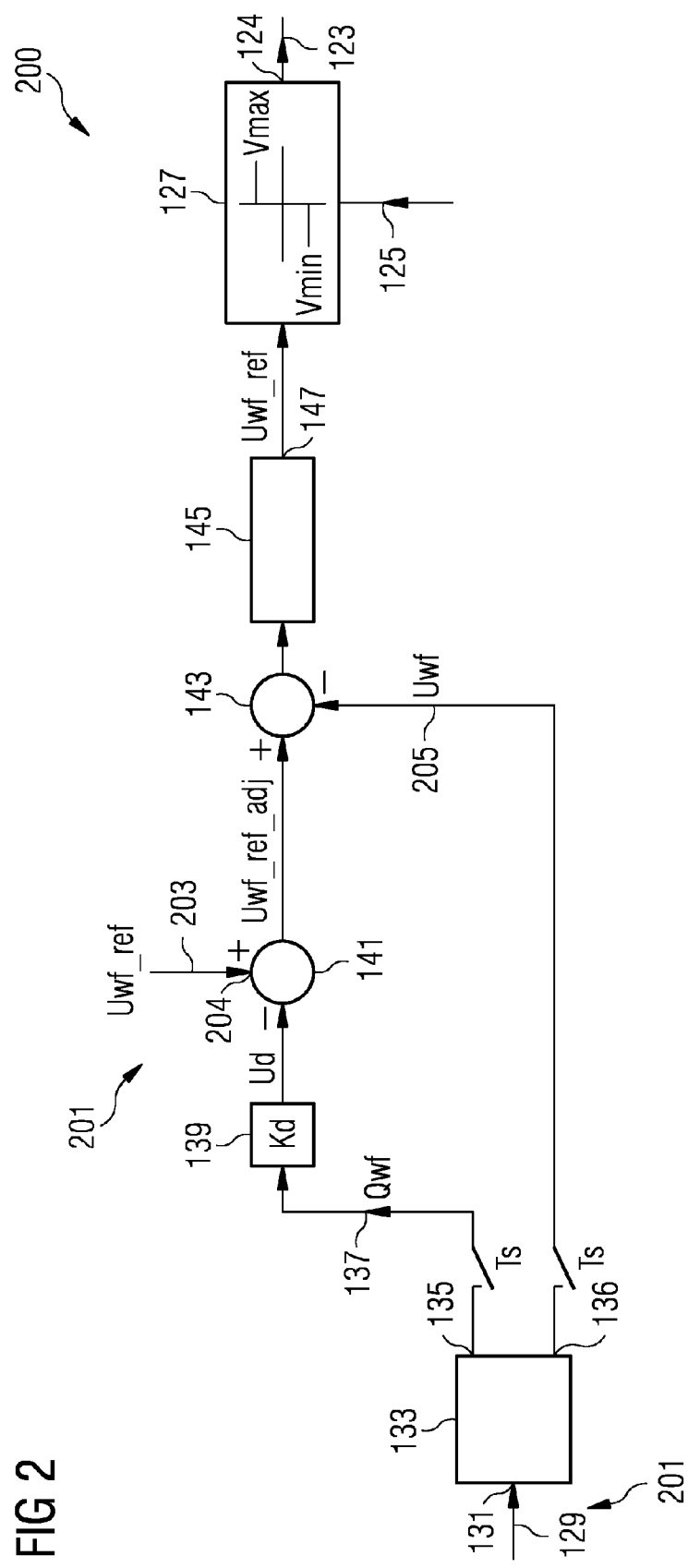
FIG. 2 schematically illustrates a wind park pilot or wind park controller or an arrangement for determining a wind turbine reference voltage according to one embodiment.
Figure 3:
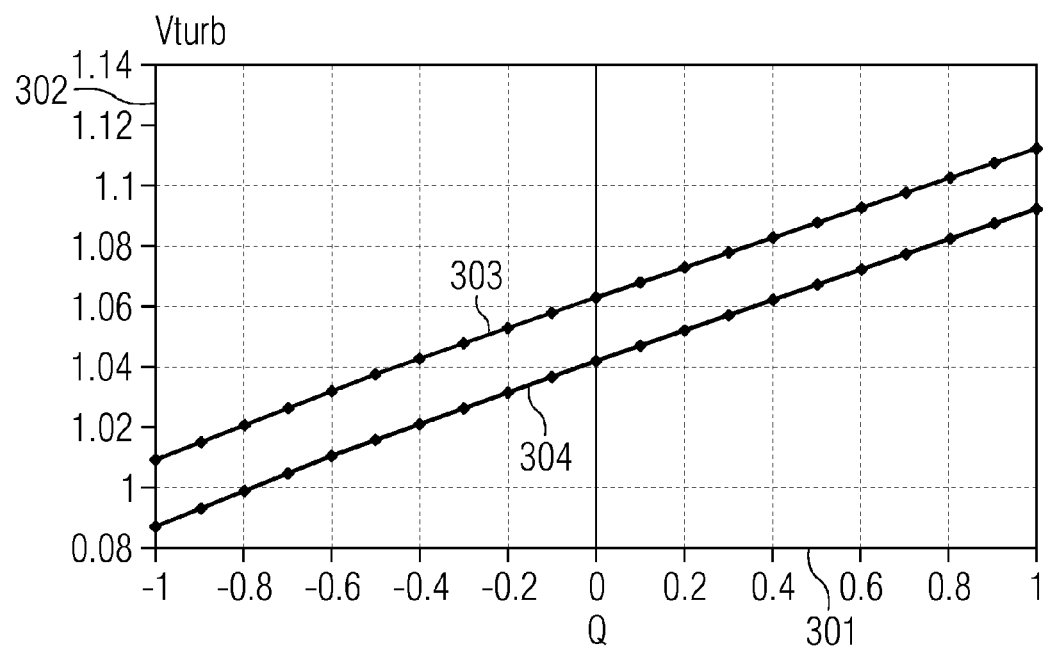
FIGS. 3-7 illustrate graphs depicting relationships of electrical properties considered in methods and arrangements according to the illustrated embodiments.
Figure 4:
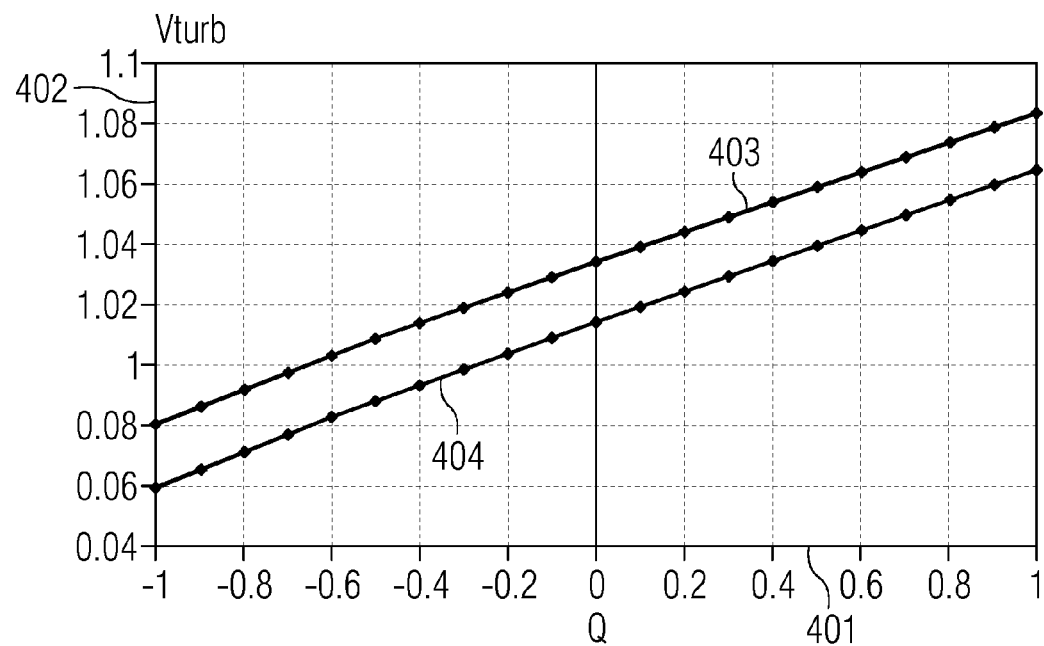
Figure 5:
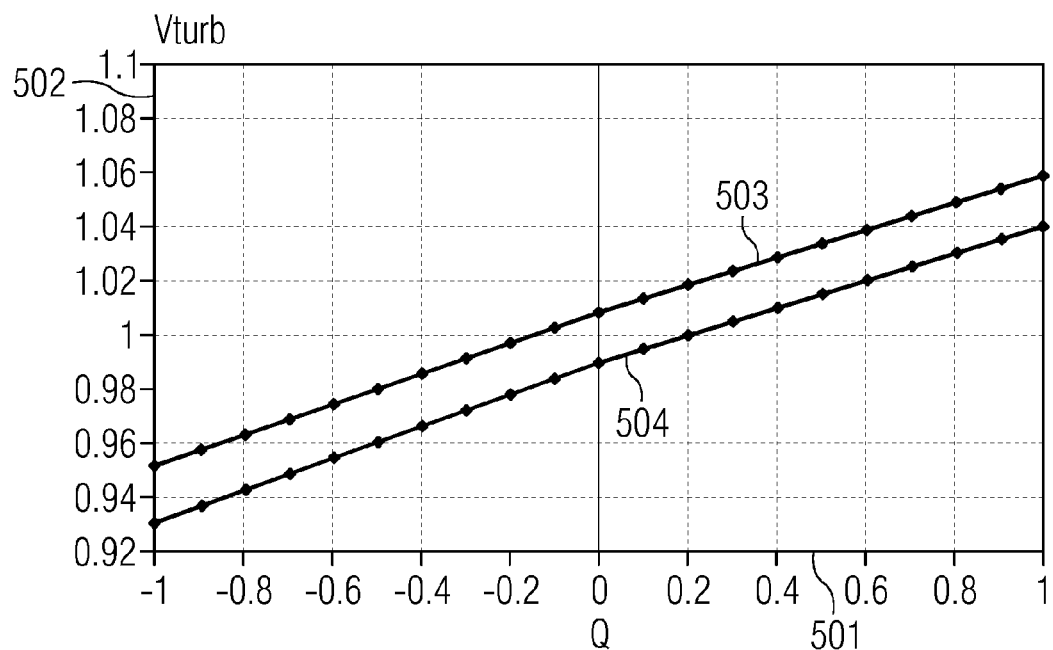
Figure 6:
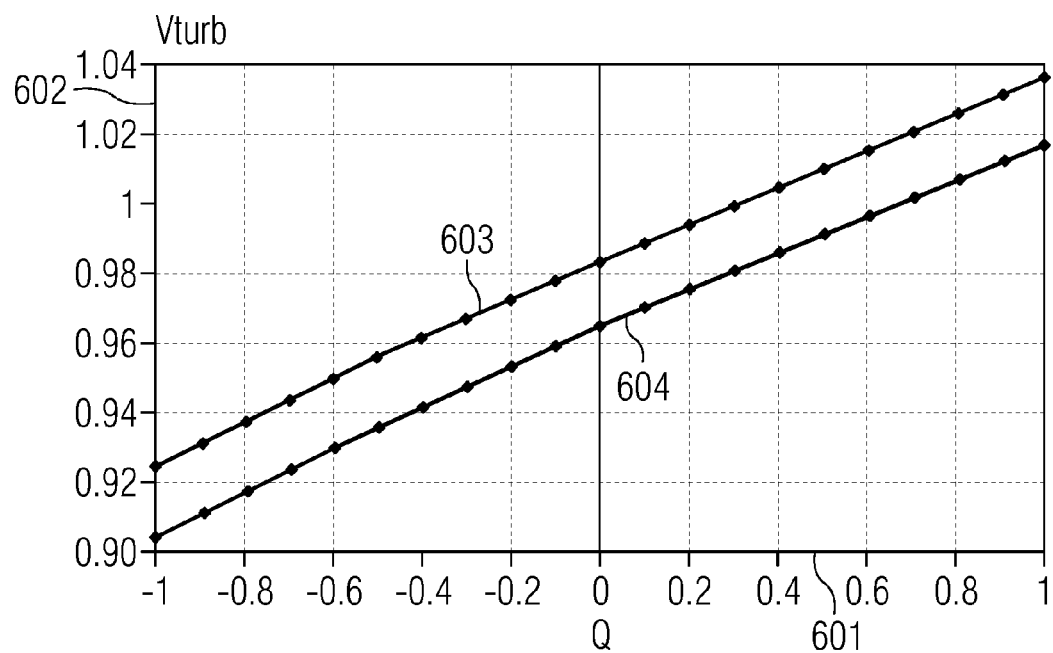
Figure 7:
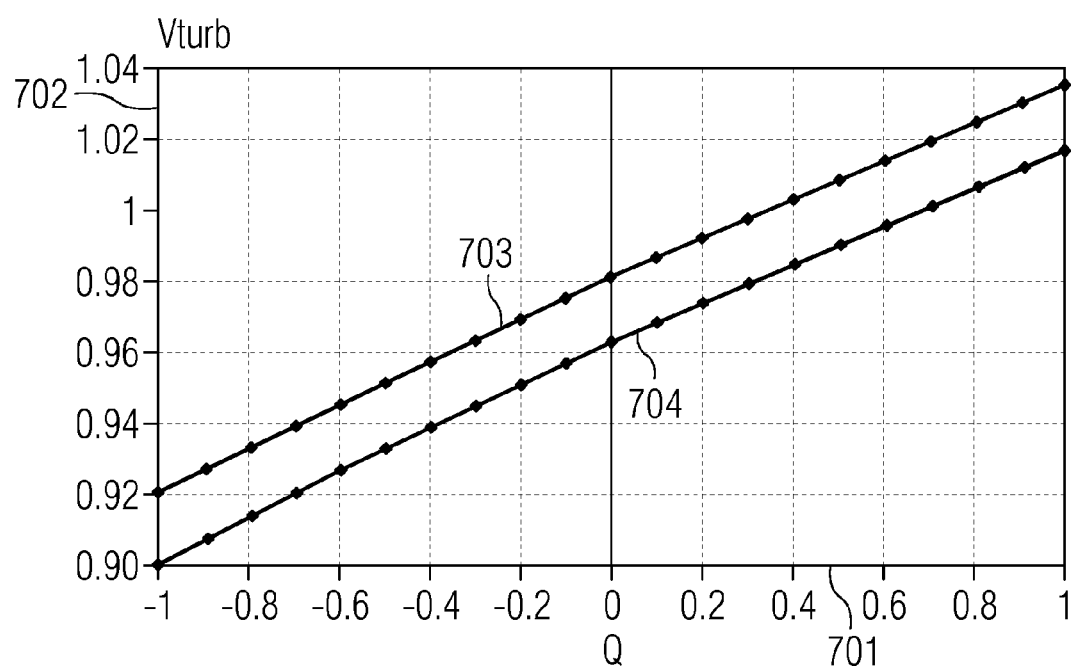

FIG. 2 schematically illustrates an arrangement for controlling a wind turbine reference voltage which may for example be comprised in a wind farm pilot, such as the wind farm pilot 121 illustrated in FIG. 1 and controlling the wind turbine 101.

The arrangement 200 comprises an input system 201 which is adapted to obtain an operator reference voltage 203 and to obtain a measured voltage 205 (Uwf) representing a voltage at the point of common coupling, such as for example the node 111 illustrated in FIG. 1. Further, the arrangement 200 comprises components forming a processor which is adapted to determine the wind turbine reference voltage 123 at an output terminal 124 based on the operator reference voltage 203 and the measured voltage 205 such as to be within a voltage bounding range 125 which is input to a bounding or limiting element 127.

In particular, the arrangement 200 receives voltage and current inputs 129 at an input terminal 131. The voltage and current inputs are averaged and low-pass filtered by a module 133. The module 133 outputs at a first output terminal 135 the reactive power 137 (Qwf) at the point of common coupling 111 and supplies it to a droop controller 139. The droop controller multiplies the reactive power 137 with a constant Kd. The result of the droop controller 139 (Ud) is supplied (as a negative thereof) to a summation element 141 to which also the operator reference voltage 203 is supplied. The result of the summation element 141 (in fact the difference between the operator reference voltage 203 and Ud) is supplied to another summation element 143 to which also the negative of the measured voltage 205 at the point of common coupling is supplied.

The result of the summation element 143 is supplied to a PI-controller 145 which comprises a control processor comprising a proportional term and an integrative term. The PI-controller 145 outputs a preliminary wind turbine reference voltage 147 (Uwt_ref) which is supplied to the limiting module 127 which limits the final output 123 of the wind turbine reference voltage to the voltage bounding range 125 which is represented in the limiting module 127 as the pair Vmin and Vmax.

The voltage bounding range 125 has previously been off-line determined by obtaining information regarding an electrical characteristic of the transmission line between the wind turbine 101 and the point of common coupling 111 illustrated schematically in FIG. 1. In particular, the voltage bounding range 125 supplied to the limiting module 127 is based on the electrical characteristic of the transmission line 106 illustrated in FIG. 1, wherein the transmission line 106 comprises the inductor 105, the wind turbine transformer 107 and the wind park transformer 109 but also other components may be comprised within the transmission line, such as one or more cables of particular length and characteristics.

In particular, knowledge about voltage profiles in a wind park may give information about what the maximally possible voltage may be. In particular, the maximally possible voltage may typically be lower than the conventional maximal voltage limit which is set to a fixed value according to a conventional system. In particular, by setting the maximal voltage limit in the voltage control system to the actually possible maximal voltage may allow a faster recovery from faulty situations. Thereby, the knowledge about the voltage profiles or the electric characteristics of the wind farm or in particular of the transmission line 106 illustrated in FIG. 1 may be gained either from power system study or based on measurements at the transmission line or within the portion of the power plant 100 illustrated in FIG. 1.

In the arrangement 200 for determining the voltage bounding range 125 the voltage range [0.92; 1.08] (as used in a conventional system) is not used for all different configurations of the transmission line 106 or the portion of the wind farm 100. Instead, the actually possible operational range of the wind turbine voltage may be determined (calculated) and used to set the voltage bounding range 125, i.e. Vmax and Vmin. The resulting reference voltage 123 is then further be limited to be within the absolute limit interval, such as [0.92; 1.08] (of the nominal voltage), to avoid entering low voltage and high voltage right through accidentally.

Table 1 gives possible values for Vmax and Vmin defining the voltage bounding range 125 for different transformation ratios m (corresponding to different tap changer positions) of the wind turbine transformer 107 illustrated in FIG. 1 being arranged between the wind turbine 101 and the point of common coupling 111.

TABLE 1

| m | Vmax | Vmin |
|---|------|------|
| 1.05 | 1.02 | 0.92 |
| 1.025 | 1.04 | 0.92 |
| 1.0 | 1.06 | 0.93 |
| 0.975 | 1.08 | 0.96 |
| 0.95 | 1.08 | 0.98 |

As can be seen from Table 1, the maximum voltage Vmax is the smaller the larger the transformation ratio m of the wind turbine transformer 107 is. Further, the minimum voltage Vmin is the smaller the larger the transformation ratio m of the wind turbine transformer 107 is.

This can also be seen from FIGS. 3 to 7 which depict on their abscissas 301, 401, 501, 601, 701, respectively, the reactive power at the wind turbine terminal 113 varying from −1 pu to 1 pu (1 pu denoting nominal reactive power at a power factor of 0.95) and depicting on their ordinates 302, 402, 502, 602, 702, respectively, the wind turbine output voltage Vturb in per unit. Thereby the upper curves 303, 403, 503, 603, 703 in FIGS. 3 to 7 correspond to the situation where the voltage at the medium side terminal 117 of the wind turbine transformer 107 is 1.01 per unit. The lower lines 304, 404, 504, 604, 704 in FIGS. 3 to 7 correspond to the situation where the voltage at the medium voltage side 117 of the wind turbine transformer 107 is to 0.99 pu. Thereby, FIGS. 3, 4, 5, 6, 7 illustrates the case that the transformation ratio m is 0.95, 0.975, 1, 1.025 and 1.05, respectively.

Determining the voltage bounding range 125 based on electrical characteristic of the transmission line 106 may improve the controlling of the wind turbine by park controller 200 illustrated in FIG. 2.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A method for determining a voltage bounding range defining a range of a wind turbine reference voltage for a wind turbine for controlling an output voltage of the wind turbine at a wind turbine output terminal, the method comprising:
    obtaining information regarding an electrical characteristic of a transmission line connecting the wind turbine output terminal to a point of common coupling to which plural other wind turbines are connectable; and
    defining the voltage bounding range based on the electrical characteristic of the transmission line.

2. The method according to claim 1, wherein the voltage bounding range is defined to be a voltage range between a maximum voltage and a minimum voltage.

3. The method according to claim 2, wherein the electrical characteristic comprises an impedance and/or a capacity and/or an inductance and/or a length and/or a voltage transformation ratio of the transmission line.

4. The method according to claim 2, wherein the electrical characteristic comprises a transformation ratio of a wind turbine transformer connected between the wind turbine output terminal and the point of common coupling, the transformation ratio being a ratio between a voltage at a medium voltage side and a voltage at a low voltage side of the wind turbine transformer, wherein the wind turbine output terminal is connected to the low voltage side of the wind turbine transformer.

5. The method according to claim 4, wherein
    the maximum voltage is the smaller the larger the transformation ratio is and/or
    the minimum voltage is the smaller the larger the transformation ratio is.

6. The method according to claim 2, wherein the maximum voltage and/or the minimum voltage depends on the active power and/or reactive power delivered to the grid.

7. The method according to claim 6, wherein the maximum voltage and/or the minimum voltage depends on a grid impedance.

8. The method according to claim 7, wherein a difference between the maximum voltage and the minimum voltage is the larger the larger the grid impedance is.

9. The method according to claim 1, wherein the defining the voltage bounding range comprises:
    establishing a physical/mathematical model of electrical components connected between the wind turbine and the point of common coupling; and/or
    performing a simulation, in particular a software simulation, of electrical components connected between the wind turbine and the point of common coupling.

10. The method according to claim 1, wherein the electrical characteristic comprises a transformation ratio of a wind park transformer connected between the wind turbine transformer and the point of common coupling.

11. The method according to claim 1, further comprising restricting the voltage bounding range to be between an absolute maximum voltage, in particular 1.08 per unit, and an absolute minimum voltage, in particular 0.92 per unit.

12. The method according to claim 1, further comprising measuring the characteristic of the transmission line, in particular regarding possible voltages at the transmission line.

13. A method for determining a wind turbine reference voltage for a wind turbine for controlling an output voltage of the wind turbine at a wind turbine output terminal, the method comprising:
performing a method for determining a voltage bounding range defining a range of the wind turbine reference voltage for the wind turbine according to claim 1;
obtaining an operator reference voltage;
obtaining a measured voltage indicative of a voltage at the point of common coupling to which the wind turbine output terminal is connected via the transmission line; and
determining the wind turbine reference voltage based on the operator reference voltage and the measured voltage such as to be within the determined voltage bounding range.

14. The method according to claim 13, wherein the determined voltage bounding range is maintained constant during operation.

15. An arrangement for determining a wind turbine reference voltage for a wind turbine for controlling an output voltage of the wind turbine at a wind turbine output terminal, the arrangement comprising:
a input system adapted to obtain an operator reference voltage and to obtain a measured voltage indicative of a voltage at a point of common coupling to which the wind turbine output terminal is connected via a transmission line; and
at least one processor configured to determine the wind turbine reference voltage based on the operator reference voltage and the measured voltage such as to be within a voltage bounding range,
at least one processor configured to determine the voltage bounding range based on an electrical characteristic of the transmission line.

16. The arrangement according to claim 15, wherein the electrical characteristic comprises a transformation ratio of a wind turbine transformer connected between the wind turbine output terminal and the point of common coupling, the transformation ratio being a ratio between a voltage at a medium voltage side and a voltage at a low voltage side of the wind turbine transformer, wherein the wind turbine output terminal is connected to the low voltage side of the wind turbine transformer.

17. The arrangement according to claim 15, wherein the electrical characteristic comprises a transformation ratio of a wind park transformer connected between the wind turbine transformer and the point of common coupling.

* * * * *